(12) United States Patent
Ferguson et al.

(10) Patent No.: US 6,571,272 B1
(45) Date of Patent: May 27, 2003

(54) METHOD AND APPARATUS FOR SNA/IP CORRELATION WITH MULTIPLE DSW PEER CONNECTIONS

(75) Inventors: Darin Ferguson, Raleigh, NC (US); Robert Clouston, Cary, NC (US); Anthony Talerico, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/315,550

(22) Filed: May 20, 1999

(51) Int. Cl.$^7$ ............................................. G06F 15/16
(52) U.S. Cl. ....................... 709/200; 709/223; 709/224; 370/357; 370/360
(58) Field of Search ................................ 709/200, 223, 709/224, 238, 249; 370/357, 360, 401, 422

(56) References Cited

U.S. PATENT DOCUMENTS

| | | | |
|---|---|---|---|
| 4,644,532 A | 2/1987 | George et al. ................. | 370/94 |
| 4,827,411 A | 5/1989 | Arrowood et al. ........... | 364/300 |
| 4,864,559 A | 9/1989 | Perlman ....................... | 370/60 |
| 4,893,307 A | 1/1990 | McKay et al. .............. | 370/94.1 |
| 5,021,949 A | 6/1991 | Morten et al. ............... | 364/200 |
| 5,027,350 A | 6/1991 | Marshall .................... | 370/85.13 |
| 5,142,622 A | 8/1992 | Owens ......................... | 395/200 |
| 5,361,256 A | 11/1994 | Doeringer et al. ............. | 370/60 |
| 5,371,852 A | 12/1994 | Attanasio et al. ............ | 395/200 |
| 5,394,402 A | 2/1995 | Ross .......................... | 370/94.1 |
| 5,473,608 A | 12/1995 | Gagne et al. ............. | 370/85.13 |
| 5,491,796 A | 2/1996 | Wanderer et al. ....... | 395/200.09 |
| 5,511,168 A | 4/1996 | Perlman et al. ......... | 395/200.15 |
| 5,517,622 A | 5/1996 | Ivanoff et al. .......... | 395/200.13 |
| 5,612,959 A | 3/1997 | Takase et al. ................ | 370/390 |
| 5,617,421 A | 4/1997 | Chin et al. .................. | 370/402 |
| 5,675,740 A | 10/1997 | Heimsoth et al. ....... | 395/200.12 |
| 5,678,006 A | 10/1997 | Valizadeth et al. ..... | 395/200.02 |
| 5,684,800 A | 11/1997 | Dobbins et al. ............. | 370/401 |
| 5,684,988 A | 11/1997 | Pitchaikani et al. ......... | 395/615 |
| 5,694,595 A | 12/1997 | Jacobs et al. ................ | 395/609 |
| 5,740,171 A | 4/1998 | Mazzola et al. ............. | 370/392 |
| 5,742,604 A | 4/1998 | Edsall et al. ................. | 370/401 |
| 5,752,003 A | 5/1998 | Hart ............................ | 395/500 |
| 5,764,636 A | 6/1998 | Edsall ......................... | 370/401 |
| 5,796,732 A | 8/1998 | Mazzola et al. ............. | 370/362 |
| 5,802,053 A | 9/1998 | Bollella et al. .............. | 370/401 |
| 5,802,313 A | 9/1998 | Mitchell et al. ......... | 395/200.68 |
| 5,835,728 A | 11/1998 | Shinomiya et al. ..... | 395/200.72 |
| 5,845,081 A | 12/1998 | Rangarajan et al. ... | 395/200.54 |

(List continued on next page.)

OTHER PUBLICATIONS

World Wide Web page www.cisco.com/univercd/cc/td/doc/cisintwk/ito_doc/dlsw.html, *Data–Link Switching (DLSw)*, Feb. 23, 1999, pp. 1–8.

World Wide Web page www.cisco.com/warp/public/558/16.html, *Cisco Catalyst Workgroup Switch Version 3.0*, Jul. 15, 1998, pp. 1–5.

(List continued on next page.)

*Primary Examiner*—Zarni Maung
*Assistant Examiner*—Jinsong Hu
(74) *Attorney, Agent, or Firm*—Cesari and McKenna, LLP (57) ABSTRACT

A technique efficiently correlates information pertaining to host and physical unit (PU) entities of a data link switching (DLSW) network comprising multiple source-route-bridge subnetworks interconnected by DLSw routers in a multi-hop peer connection topology. A DLSw peer connection is established between a local DLSw router and its remote "peer" DLSw router over each IP cloud; each DLSw peer connection manifests as a DLSw circuit that is identified by, inter alia, a data link identifier comprising attachment addresses of the host and PU entities. The inventive technique efficiently correlates SNA-specific information relating to the host and PU entities with IP-specific information relating to the DLSw routers to draw the multi-hop network topology needed to assist in problem isolation.

20 Claims, 5 Drawing Sheets

U.S. PATENT DOCUMENTS

| | | | | |
|---|---|---|---|---|
| 5,909,550 A | * | 6/1999 | Shankar et al. | 709/227 |
| 6,065,062 A | * | 5/2000 | Periasamy et al. | 709/242 |
| 6,084,879 A | * | 7/2000 | Berl et al. | 370/389 |
| 6,269,099 B1 | * | 7/2001 | Borella et al. | 370/389 |

OTHER PUBLICATIONS

World Wide Web page www.cisco.com/warp/public/539/7.html, *Cisco VLAN Roadmap*, Jul. 15, 1998, pp. 1–9.

Draft Standard for Virtual Bridged Local Area Networks, P802.1Q/D6, May 16, 1997, pp. 1–10, 70–72.

IAC Newsletter Database, *Cisco Announces New Fast Ethernet Interface*, Apr. 15, 1995, pp. 2–3.

IAC Newsletter Database, *Cisco Announces Token–Ring Switching Products*, Apr. 15, 1995, pp. 4–5.

Wells, et al., DLSw Standardwk, *Data Link Switching: Switch–to–Switch Protocol*, Apr. 1995, pp. 1–91.

World Wide Web page www.cisco.dk/warp/public/100/44.html, *SNA Internetworking*, May 10, 1999, pp. 1–5.

World Wide Web page www.cisco.com/warp/public/558/61.html, *Cisco Channel Interface Processor*, May 10, 1999, pp. 1–10.

World Wide Web page www.cisco.com/warp/public/614/2.html, *DLSw and DLSw+*, Sep. 28, 1999, pp. 1–8.

* cited by examiner

METHOD AND APPARATUS FOR SNA/IP CORRELATION WITH MULTIPLE DSW PEER CONNECTIONS

CROSS-REFERENCE TO RELATED APPLICATIONS

The present invention is related to the following copending and commonly assigned U.S. Patent Applications:

U.S. patent application Ser. No. 08/999,271 now U.S. Pat. No. 6,131,117 titled, Technique for Correlating Logical Names with IP Addresses on Internetworking Platforms, by Wayne Clark et al., filed on Dec. 29, 1997;

U.S. patent application Ser. No. 09/315,551, now U.S. Pat. No. 6,490,618B1 titled, Method and Apparatus for SNA/IP Correlation in a Mixed APPN and DLSw Network, by Darin Ferguson et al., filed herewith;

U.S. patent application Ser. No. 09/315,444 titled, Method and Apparatus for Determining SNA Sessions Using Various Protocols for Transport Based on Filter Criteria, by Darin Ferguson et al., filed herewith, U.S. patent application Ser. No. 09/315,443 titled, Method and Apparatus for Determining a Path for a Session Using Various Protocols for Transport, by Darin Ferguson et al., filed herewith; and U.S. patent application Ser. No. 09/315,284, now U.S. Pat. No. 6,430,595 titled, Method and Apparatus for Establishing a Database Used for Correlating Information Gathered via SNMP, by Darin Ferguson et al., filed herewith, each application of which is hereby incorporated by reference as though fully set forth herein.

FIELD OF THE INVENTION

The present invention relates to computer networks and, more particularly, to management of entities in a computer network having a multi-hop peer connection topology.

BACKGROUND OF THE INVENTION

Data communications in a computer network involves the exchange of data between two or more entities interconnected by communication links and subnetworks. These networks are typically software programs executing on hardware computer platforms which, depending on their roles within a network, may serve as host stations, end stations or intermediate stations. Examples of intermediate stations include routers, bridges and switches that interconnect communication links in subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passed through each layer, and the layers communicate with each other by means of the predefined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the System Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets-generally referred to as "datagrams" in an Internet environment-and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks, 3rd edition*, by Andrew S. Tanenbaum, published by Prentice-Hall, PTR in 1996, all disclosures of which are incorporated herein by reference, particularly at pages 28–54.

SNA is a communications framework widely used to define network functions and establish standards for enabling different models of IBM computer to exchange and process data. SNA is essentially a design philosophy that separates network communications into several layers termed, in ascending order, the physical control, the data link control, the path control, the transmission control, the data flow control, the presentation services and the transaction services layers. Each of these layers represents a graduated level of fimction moving upward from physical connections to application software.

In the SNA architecture, the data link control layer is responsible for transmission of data from one end station to another. Bridges or devices in the data link control layer are used to connect two or more LANs so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 logical link control type 2 (LLC2) connection, is established between the source and destination stations. Once the connection has been established, data is transferred sequentially over the path and, when the LLC2 connection is no longer needed, the path is terminated. Reliable communication of the LLC2 is well known and described by Andrew Tanenbaum in his book *Computer Networks, Sec-* ond *Edition*, published in 1988, all disclosures of which are incorporated herein by reference, especially at pages 253–257.

Figure 1:
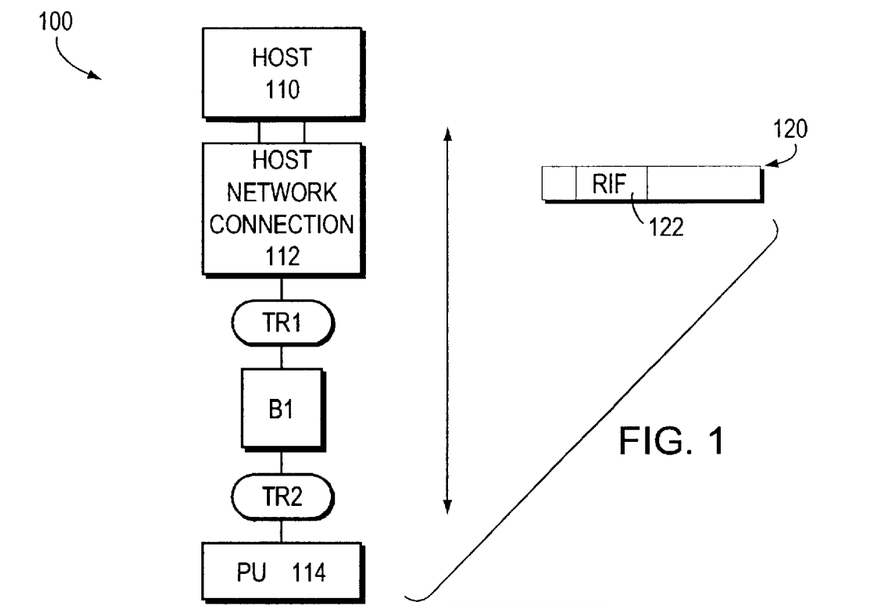
FIG. 1 is a schematic block diagram of a conventional computer network having a host computer and end station coupled to a plurality of token ring local area networks to form a source-route bridge (SRB) network.

FIG. 1 is a schematic block diagram of a conventional computer network 100 having a host computer coupled to a Token Ring (TR) network TR1 and an end station coupled to TR2. The TR networks are of the type that support Source/Route Bridging (SRB) operations with respect to the contents of a routing information field (RIF) of a frame. The host computer is preferably a SNA host entity comprising a mainframe computer 110 coupled to a channel-attached router or front end processor (FEP), hereinafter referred to as the "host network connection" 112; in addition, the end station is a "physical unit" (PU) SNA entity 114. An SRB bridging device B1 interconnects TR1 and TR2 such that the SRB network 100 effectively functions as a LAN.

The PU communicates with the host by exchanging TR frames over LLC2 connections or sessions through the SRB network. Each TR frame 120 includes a RIF 122 that contains source route information in the form of ring number/bridge number pair "hops" within a path between the stations. For example, the RIF 122 of TR frame 120 transmitted by the PU to host contains [0021.0010]. An LLC2 session is established between the stations using a special TR frame, called an explorer frame.

The explorer frame is used by a source (PU) to "discover" the path to a destination (host); thereafter, a Set Asynchronous Balanced Mode Extended (SABME) frame is sent from the PU to the host to establish a logical connection between the end stations, and the host responds to the SABME frame with an Unnumbered Acknowledgment (UA) frame. Once the UA frame is received by the PU, a connection is established between the source and destination, and these stations communicate by exchanging TR information (INFO) and acknowledgment frames until the logical link SNA session is completed.

For example, the PU transmits an INFO frame over TR2 and through BR1 and TR1 to the host. Upon successfully receiving the INFO frame, the host responds by transmitting an LLC2 Receive/Ready (RR) acknowledgment frame over the SRB network to the PU. This INFO/RR exchange continues until the PU has successfully transmitted all of its data and the host has successfully received all of that data. Session completion is then initiated by a Disconnected Mode (DM) frame being transmitted from the PU to the host; the disconnection is thereafter acknowledged by the host responding with a UA frame. The LLC2 frames (packets) are described by Radia Perlman in her book *Interconnections, Bridges and Routers*, published by Addison Wellesly Publishing Company, in 1992, all disclosures in which are incorporated herein by reference, particularly at pages 33–34.

As noted, each TR INFO frame sent from a source to a destination is acknowledged by an RR frame; if the source end station does not receive the acknowledgment frame within a prescribed period of time, a "time-out" may occur and the source sends a DM frame to prematurely terminate the session. Since network 100 is a LAN, it facilitates fast transfer of information between its connected stations and, as a result, a time-out condition should rarely occur. If a WAN such as a TCP/IP cloud is disposed within a LAN-based network, it is likely that a time-out will arise because of the latencies introduced by the TCP/IP cloud. That is, a frame traversing the WAN cloud incurs substantial delay as opposed to the LAN because the WAN is generally not as fast as the LAN.

Data Link Switching (DLSw) is a mechanism for forwarding SNA protocol frames over, e.g., a TCP/IP backbone WAN such as the Internet. In traditional bridging, the data link connection is end-to-end, i.e., effectively continuous between communicating end stations. A stream of data frames originating from a source station on a source LAN traverses one or more bridges specified in the path over the LLC2 connection to a destination station on a destination LAN. In a network implementing DLSw, by contrast, the LLC2 connection terminates at a local DLSw device entity, e.g., a router. An example of a DLSw network arrangement may comprise a host DLSw router connected to a host computer via a host LAN and a remote DLSw router connected to a remote LAN having a destination station. The LANs that are accessed through the DLSw routers may appear as SRB subnetworks attached to adjacent rings; each of these adjacent rings manifest as a virtual ring within each DLSw router that effectively terminates the SRB network.

Figure 2:
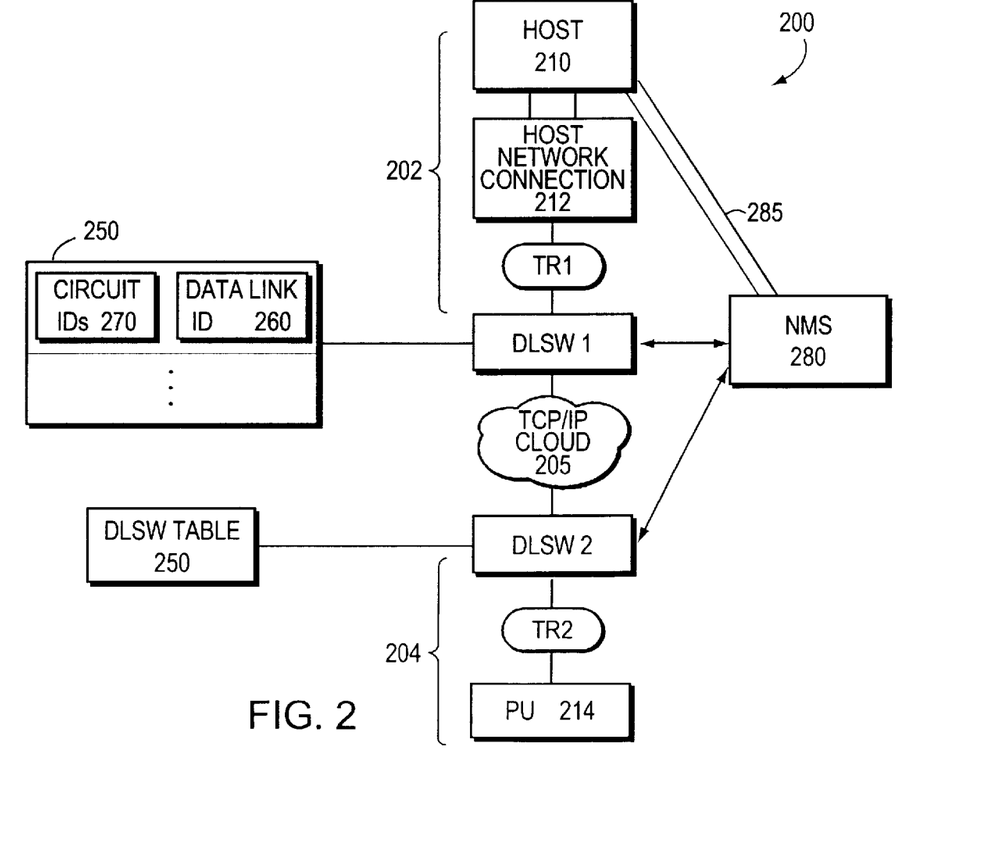
FIG. 2 is a schematic block diagram of a data link switching (DLSw) network having a wide area network (WAN) cloud disposed between host and remote SRB subnetworks.

FIG. 2 is a schematic block diagram of such a DLSw network 200 having a TCP/IP cloud 205 disposed between host and remote SRB subnetworks 202, 204. When communicating with the host as described above, the PU sends an INFO frame to which host responds with an RR frame. Because of the latencies introduced by the WAN cloud, however, a time-out condition may occur during this exchange. The DLSw network includes host and remote DLSw routers 1,2 that border the WAN cloud. These DLSw routers function as end points between TCP sessions over the TCP/IP cloud when transporting TR frames associated with LLC2 sessions over that intermediate network. DLSw switching may obviate the time-out problem introduced by the TCP/IP cloud by, e.g., having DLSw1 return a RR acknowledgment frame to the source end station (PU) upon receiving an INFO frame. Notably, the RR frame is returned prior to transmitting the native TR INFO frame over the TCP/IP network.

Broadly stated, each DLSw router establishes a "peer relationship" to the other DLSw router in accordance with a conventional capabilities exchange message sequence, and the logical and physical connections between these routers connect the subnetworks into a larger DLSw network. To establish a peer connection in accordance with an implementation of DLSw switching, the host DLSw router first opens logical TCP (Read/Write) "pipe" connections to the remote DLSw router using a conventional socket technique to create a socket into the transport layer of the protocol stack. Once the TCP pipes are established, a Switch-to-Switch (SSP) Protocol is used to transport the capabilities exchange messages between the two DLSw routers.

The capability exchange messages contain various parameters, such as the number of pipes used for communicating between the DLSw routers and the largest frame size supported by the routers. Each DLSw router responds to each capability exchange message issued by its peer router with a capability exchange response message. Upon completion of the exchange, each router reconfigures itself to "act upon" the agreed capabilities and the peer connection is established. Establishment of a peer connection can occur automatically upon "boot-up" of each DLSw router; that is, as soon as a DLSw router activates, it connects with its DLSw peer. The DLSw forwarding mechanism is well known and described in detail in Wells et al. *Request For Comment (RFC)* 1795 (1995).

Upon receiving a TR frame from a source on the host SRB subnetwork that is destined for a destination on the remote SRB subnetwork, the host DLSw router employs the SSP protocol to communicate with its DLSw peer router by forwarding the native TR frame over the TCP/IP network to the remote SRB subnetwork. That is, the TR frame received at the host DLSw router from the source is encapsulated within a SSP protocol frame and forwarded over the TCP/IP cloud to the remote DLSw router. The source route information contained in the RIF of each TR frame terminates inside the virtual ring of the DLSw router; notably, the RIF information is locally stored at the DLSw router.

The host DLSw router then multiplexes the LLC2 session data stream over a conventional TCP transport connection to a remote DLSw router. LLC2 acknowledgment frames used to acknowledge ordered receipt of the LLC2 data frames are "stripped-out" of the data stream and acted upon by the host DLSw router; in this way, the actual data frames are permitted to traverse the IP cloud to their destination while the "overhead" acknowledgment frames required by the LLC2 connections for reliable data delivery are kept off the cloud. The LLC2 connections from the source LAN to the host transmitting DLSw router, and from the remote receiving DLSw router to the destination LAN, are entirely independent from one another. Data link switching may be further implemented on multi-protocol routers capable of handing DLSw devices as well as conventional (e.g., SRB) frames.

DLSw routers can establish multiple parallel TCP sessions using well-known port numbers. All frames associated with a particular LLC2 connection typically follow a single designated TCP session. Accordingly, SNA data frames originating at the PU are transmitted over a particular LLC2 connection along TR2 to DLSw 2, where they are encapsulated within a designated TCP session and transported over the TCP/IP cloud 205. The encapsulated messages are received by DLSw1, decapsulated to their original frames and transmitted over a corresponding LLC2 connection of TR1 to the host in the order received by DLSw2 from the PU.

The LLC2 connection between the PU and host is identified by a data link identifier (ID) 260 consisting of a pair of attachment addresses associated with each end station. Each attachment address is represented by the concatenation of a media access control (MAC) address (6 bytes) and a LLC service access point (SAP) address (1 byte). Specifically, each attachment address is classified as either a target address comprising a destination MAC (DMAC) and a destination SAP (DSAP), or an origin address comprising a source MAC (SMAC) and source SAP (SSAP) addresses. The attachment addresses are contained in the TRs frame exchanged between the PU and host entities.

Furthermore, the designated TCP session is identified by a pair of circuit IDs 270, each comprising a 64-bit number that identifies the LLC2 circuit within a DLSw circuit. The DLSw circuit ID generally comprises a data link circuit port ID (4 bytes) and a data link correlator (4 bytes). A pair of circuit IDs along with a data link ID uniquely identifies a single end-to-end circuit through the network. Notably, each DLSw router maintains a table 250 comprising a plurality of data link ID and corresponding DLSw circuit ID pair entries. In order to associate LLC2 frame traffic with a corresponding DLSw circuit when communicating over the IP cloud, each DLSw router typically indexes into the table (the "DLSw table") using a data link ID to find the corresponding DLSw circuit IDs.

The DLSw circuit information described above, including the data link IDs, are available to a network operator of a network management station (NMS) 280 via a Simple Network Management Protocol (SNMP) configured to access DLSw management information base (MIB) tables within the routers. The MIB and SNMP protocol, and their use in providing network management information between SNMP management stations and agents are well-known and described in, e.g., SNMP, SNMPv2 and RMON by William Stallings, printed by Addison Wesley Publishing Company, 1996.

The orientation of the MAC/SAP attachment addresses of the data link IDs acquired from each router is dependent on the proximity of the SNA entity to which the router is connected. For example, the remote DLSw router identifies the PU MAC/SAP attachment address as origin and the host network connection MAC/SAP attachment address as target, whereas the host DLSw router identifies the PU and host connection addresses in reverse order. The DLSw routers do not, however, maintain the name of the PU, which is a common way for an operator to identify a session.

A problem involving a PU session in the network 200 may be diagnosed by the network operator using a conventional approach that correlates SNA frame traffic sessions to DLSw routers for a network having only a single peer connection over an IP cloud between DLSw peer routers. According to this approach, the NMS communicates with an SNMP agent in each DLSw router to acquire DLSw MIB information including a data link ID identifying a DLSw circuit associated with the router. The NMS also issues commands to the host over a pipe connection 285 to retrieve the SNA-specific information from VTAM. Since the host computer "owns" SNA sessions in the network, it maintains SNA-specific information such as the PU name and the MAC/SAP addresses for the host network connection and the PU on a virtual telecommunications access method (VTAM) table in the host. The SNA-specific information retrieved from VTAM does not, however, include information with respect to the DLSw routers that are routing the session traffic.

In response to a query from the operator specifying a PU name of the session, the NMS compares the MAC/SAP addresses retrieved from VTAM with the data link IDs in the MIBs to identify a DLSw circuit at each router. The NMS then uses the orientation of the MAC/SAP attachment addresses from the routers to distinguish between the host and remote DLSw routers. Thereafter, the NMS can draw the topology of the DLSw network, including the DLSw circuit and PU session, to isolate any failures in the network.

A limitation of the conventional approach is that only a single set of DLSw peer routers may be "discovered", resulting in a partial description of the network. Rather than diagnosing a network having only a single DLSw peer connection, the present invention is directed to a more complicated network arrangement having multiple DLSw peer connection "hops". The present invention provides tools that enable a complete view of the network having multiple DLSw peer connections. In particular, the present invention is directed to a technique for correlating SNA/IP information within a DLSw network having a multi-hop peer connection topology to enable drawing of a session and diagnosing of problems.

SUMMARY OF THE INVENTION

The present invention comprises a technique for efficiently correlating information pertaining to entities of a computer network having a multi-hop peer connection topology. The computer network is a data link switching (DLSw) network comprising multiple source-route-bridge (SRB) subnetworks interconnected by, e.g., Internet protocol (IP) clouds. The entities comprise System Network Architecture (SNA) host mainframe ("host") and physical unit (PU) entities, along with DLSw routers. A DLSw peer connection is established between a local DLSw router and its remote "peer" DLSw router over each IP cloud; each DLSw peer connection comprises DLSw circuits that are identified by, inter alia, data link identifiers (IDs) comprising attachment addresses of the host and PU entities.

The DLSw network environment is managed by a network management station (NMS) configured to communicate with the DLSw routers using a simple network management protocol (SNMP) to acquire the IP-specific information for storage on a management information base (MIB) database of the NMS; in addition, the NMS communicates with the host over "pipe" connection to retrieve the SNA-specific information for storage on a VTAM database of the NMS. In accordance with the inventive technique, the NMS correlates the SNA-specific information with the IP-specific information to draw the multi-hop network topology to assist in problem isolation. As a result, the NMS can interactively access the DLSw routers while also obtaining address information about the SNA entities in the network.

The SNA-specific information includes media access control (MAC) and service access point (SAP) addresses of the host and PU entities, along with source routing information, hereinafter referred to as a "routing information field (RIF)", associated with a SRB subnetwork coupled to the host. This information is preferably stored on a virtual telecommunication access method (VTAM) table of the host coupled to the network. On the other hand, the IP-specific information collected from each DLSw router includes (i) origin and target attachment (MAC/SAP) addresses of a DLSw circuit associated with the router, (ii) a circuit state of its DLSw circuit, (iii) a RIF, and (iv) an IP address of its peer DLSw router.

According to the invention, the technique involves determining the number of peer connection (DLSw circuit) "hops" in the network by matching data link IDs stored on the MIB database with the MAC/SAP addresses of the host and PU entities retrieved from the VTAM database. As noted, each data link ID comprises origin and target attachment (MAC/SAP) addresses of a DLSw circuit associated with each router; the order of these addresses is dependent on the proximity of the SNA entity connected to each router. For example, the remote DLSw router of each peer connection identifies the MAC/SAP addresses of the PU as its origin attachment address and the MAC/SAP addresses of the host network connection as its target attachment address; the host DLSw router of that peer connection identifies the PU and host connection addresses in reverse order. Thus, each host (and remote) DLSw router of each peer connection hop will have a matching set of origin and target attachment addresses (or data link IDs) and the number of matching sets equal the number of peer connections.

Once the number of DLSw circuits have been identified, the technique proceeds to verify that the circuits have the same status. The DLSw circuits generally have the same status as the data traffic (PU session) they service; thus, if the PU session is active, all DLSw circuits are active and if the session is inactive, all the circuits are inactive. If one of the circuits is inactive while another is active, the network topology may include an alternate path that the session traversed through the DLSw network. According to this step of the technique, the status of each DLSw circuit is determined by examining its circuit state (active or inactive) stored in the MIB database. To ensure the state information is up-to-date, each router may be "demand-polled" for its IP-specific information, rather than retrieving the information from the MIB database.

Upon validating the active state of each circuit, the inventive technique proceeds to determine the order of the DLSw peer routers. As noted each host (and remote) router associated with each DLSw circuit maintains a similar PU and host orientation, but it may be unclear as to which circuit, and thus which pair of routers, is closer in proximity to the host (or to the PU). Such order determination is accomplished by examining the local RIF acquired from each router.

The RIF contains source route information in the form of ring number/bridge number tuples within a path between the stations. In a SNA session traversing a single DLSw circuit, there is a RIF between the remote router and the PU, and a RIF between the host router and the host network connection. If the session traverses two DLSw circuit hops, there is a first RIF between a first host router of a first circuit and the host network connection, a second RIF between the first remote router of the first circuit and a second host router of a second circuit, and a third RIF between a second remote router of the second circuit and the PU. It should be noted that the second RIF may also be calculated from the second host router to the first remote router wherein only a direction bit in the RIF differs. According to the invention, the matching second RIF informs the NMS that the two DLSw routers (i.e., the second host and first remote routers) storing that RIF are coupled together.

The RIF values are provided by the DLSw routers as part of the IP-specific information collected by the NMS. The host (VTAM) also maintains RIF information pertaining to its own host network connection with the first host router; this latter information may be useful to identify the first host DLSw router.

Once the order of the DLSw peer routers is determined, the topology of the DLSw network may be drawn, illustrating the relationship between the DLSw router and the SNA entities of the network. Such correlation allows the NMS to manage relationships between the entities for purposes of, e.g., activating/deactivating those entities and monitoring SNA frame traffic encapsulated within IP protocol packets. In addition, the inventive correlation technique may be used for troubleshooting operations to identify associations between specific DLSw and SNA entities, and to generally view dependency relationships between such entities in the integrated network environment.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 3:
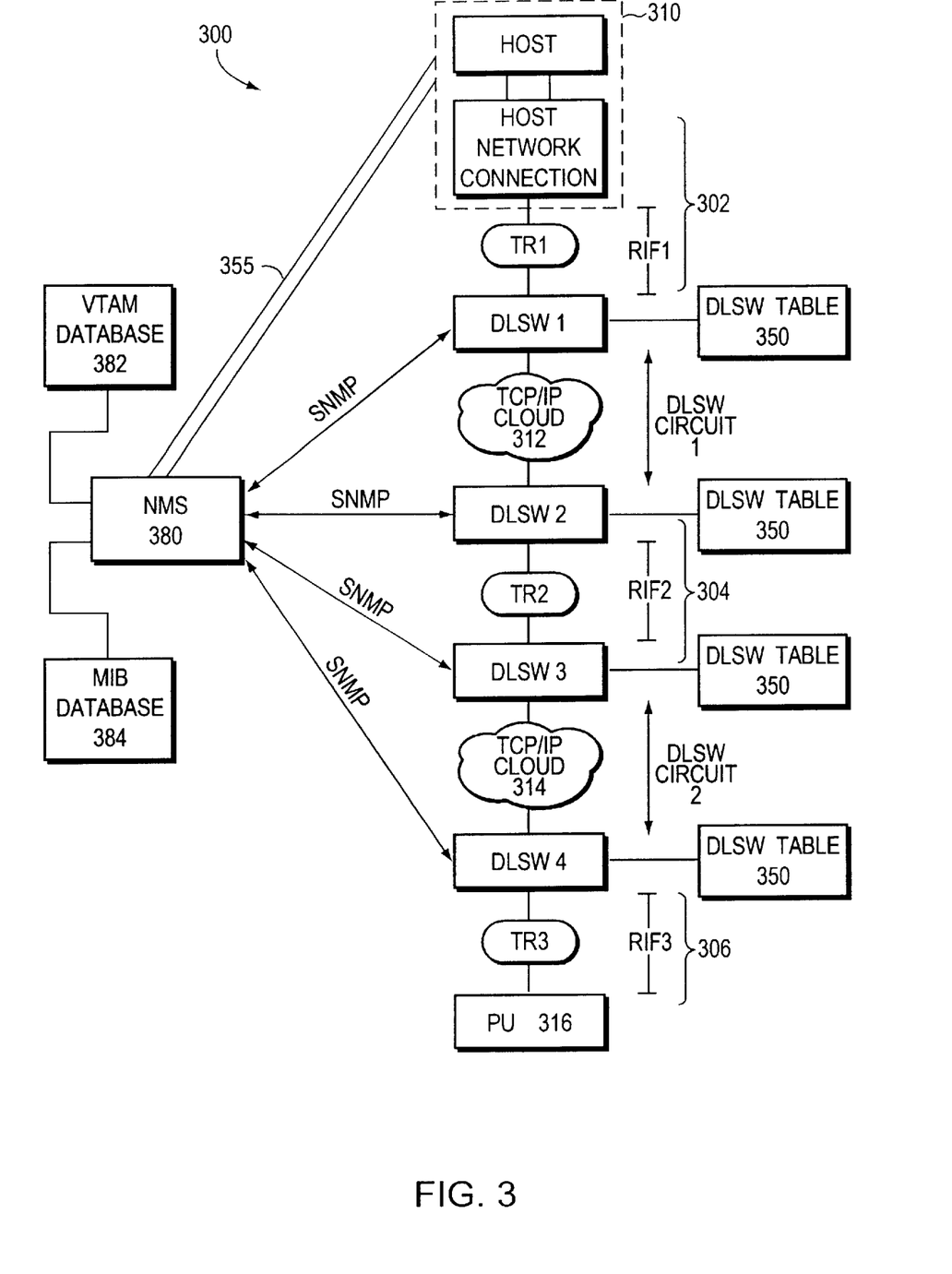
FIG. 3 is a highly schematic block diagram of a DLSw network comprising a plurality of SRB subnetworks interconnected by a plurality of WANs to form a computer network having a multi-hop peer connection topology that may be advantageously used with the present invention.

FIG. 3 is a highly schematic block diagram of a data link switching (DLSw) network 300 comprising a plurality of subnetworks 302–306 interconnected by a plurality of wide area networks (WANS) 312–314 to form a computer network. Each subnetwork 302–306 is preferably of a type that supports source-route bridging (SRB) operations with respect to the contents of a routing information field (RIF) of a frame. The subnetworks are attached to a plurality of stations preferably embodied as internetworking computer platforms and comprising a host computer, a physical unit (PU), a network management station (NMS) 380 and a plurality of intermediate stations. The host computer is preferably a Systems Network Architecture (SNA) host entity comprising a mainframe computer coupled to a channel-attached router or front end processor (FEP), hereinafter referred to as the host network connection or "host" 310. In particular, the host is coupled to a token ring (TR) local area network (LAN) TR1 to form subnetwork 302 and the PU 316 is coupled to TR3 to form subnetwork 306.

Each station typically comprises a plurality of interconnected elements, such as a processor, a memory and an input/output (I/O) unit. The memory may comprise storage locations addressable by the processor and I/O unit for storing software programs and data structures associated with the inventive multi-hop peer connection correlation technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the technique described herein.

The I/O unit, in turn, connects the station to mass storage devices, such as disks, and to the subnetworks. The NMS may further include a conventional display monitor with a display screen and cursor control devices, such as a keyboard, connected to I/O unit. A window environment, such as a graphical user interface (GUI), is preferably displayed on the screen as a graphical display to facilitate interactions between a network operator and the station. For the NMS and intermediate stations, the disk may function as a database for storing network information, as described further herein. Typically, the I/O unit receives information, such as control, address and data signals, from the keyboard or the database, and provides that information to the processor for display on the screen or for transfer over the subnetworks.

The intermediate stations are preferably DLSw routers used to interconnect the subnetworks and facilitate communication among the host and PU over the WANs 312–314. Communication among the stations is effected by exchanging discrete packets or frames of data according to predefined protocols and services; an example of a connection-oriented service that may be used to ensure reliable communication between the PU station and the host station is an IEEE 802.2 Logical Link Control Type 2 (LLC2) connection service. The DLSw routers facilitate such communication by establishing peer relationships among themselves through the exchange of conventional capabilities exchange messages, as defined in RFC 1795. These peer devices further cooperate to establish a conventional reliable transport connection, such as a TCP connection, that enables multiplexing of LLC2 data frames over the TCP transport between the devices.

As a result, some of the DLSw devices function as peers having logical and physical connections among them for interconnecting the subnetworks 302–306 through the WANs 312–314 to form the DLSw network 300. Each logical connection is manifested as a DLSw circuit having a data link identifier (ID) comprising media access control (MAC) and service access point (SAP) attachment addresses of the host and PU entities. For example, DLSw circuit 1 extends between DLSw1 and DLSw2 and DLSw circuit 2 extends between DLSw3 and DLSw4. The generation of DLSw circuits and identifiers is described in *Request for Comment (RFC)* 1795 by Wells & Bartky, 1995, while the establishment of TCP sessions is described in Internetworking with TCP/IP by Comer and Stevens, printed by Prentice Hall, 1991; all of these publications are hereby incorporated by reference as though fully set forth herein.

Specifically, DLSw1 is configured as a first host router coupled to TR1 and having a peer relationship with a first remote router DLSw2 over WAN 312, which is preferably an IP cloud. DLSw3 is configured as a second host router coupled to TR3 and having a peer relationship with a second remote router DLSw4 over IP cloud 314. Lastly, DLSw2 is coupled to DLSw3 over TR2 (subnetwork 304) to form a multi-hop, DLSw peer connection network 300 that may be advantageously used with the present invention.

The RIF contains source route information in the form of ring number/bridge number tuples within a path between the stations. There is a RIF1 associated with subnetwork 302, a RIF2 associated with subnetwork 304 and a RIF3 associated with subnetwork 306. The RIF information terminates inside a virtual ring of each DLSw router and is locally stored at the DLSw router, preferably on a DLSw table 350. Thus, RIF1 is "cached" at DLSw1, RIF2 is cached at DLSw2 and DLSw3, and RIF3 is cached at DLSw4. In addition, each DLSw table 350 contains data link and circuit IDs of a DLSw circuit associated with the respective DLSw router.

The DLSw network environment is managed by the NMS which, in the illustrative embodiment, is preferably a UNIX workstation configured to execute a network management application. An example of such an application is the Cisco Works Blue Maps and Cisco Works Blue SNA View product set, available from Cisco Systems, Inc. The Cisco Works Blue product set provides a network operator with tools to draw a path of data transferred through the DLSw network. That is, the product set provides a view of an SNA data session extending from the PU through a single DLSw peer connection to the host network connection. Using the product set, the operator may diagnosis and fix problems by understanding the data path through the network, and isolating the problem to one of the segments in the network. The present invention is an extension to the conventional approach for correlating SNA/IP information in a DLSw network and is directed to a multi-hop peer connection topology utilizing this product set.

The Cisco Works Blue SNA View tool has a mainframe component and a UNIX workstation component that allows the NMS to retrieve SNA-specific information about the host and PU entities. The NMS 380 communicates with the host station over a TCP/IP (or LU 6.2) "pipe" connection 355 to acquire the SNA-specific information available from a virtual telecommunication access method (VTAM) table at the host. The SNA-specific information acquired from VTAM includes (i) MAC/SAP addresses of the host and PU, (ii) the PU name, (iii) the PU status and (iv) the RIF1 associated with subnetwork 302. This information is stored in a VTAM database 382 of the NMS.

The NMS 380 also communicates with the DLSw routers using a simple network management protocol (SNMP) to acquire IP-specific information. Here, the Cisco Works Blue SNA View tool queries SNMP agents in the DLSw routers to acquire the information used to determine the peer relationships among the DLSw routers. The IP-specific information provided by each DLSw router includes (i) origin and target attachment (MAC/SAP) addresses of a DLSw circuit associated with the router, (ii) a circuit state of its DLSw circuit, (iii) its associated RIF, and (iv) an IP address of its peer DLSw router. Specifically, the following IP-specific information is available from each router:

| Router | Local MAC/SAP | Remote MAC/SAP | Peer Router | RIF |
|---|---|---|---|---|
| DLSw1 | Host | PU | DLSw2 | RIF1 |
| DLSw2 | PU | Host | DLSw1 | RIF2 |
| DLSw3 | Host | PU | DLSw4 | RIF2 |
| DLSw4 | PU | Host | DLSw3 | RIF3 | a In accordance with the invention, the IP-specific information must be collected from at least one of each pair of routers (i.e., DLSw1–DLSw2 and DLSw3–DLSw4). In this case, all of the necessary information except the RIF can be inferred about the other peer router. However, if IP information is not collected from DLSw1, such information must be collected from DLSw3 to determine, as described below, which router is closest to the host.

The NMS acquires the IP-specific information from the routers via DLSw management information base (MIB) structures for storage on a MIB database 384 of the NMS 380. An example of a DLSw MIB that may be advantageously used with the present invention is disclosed in *Request for Comment* (*RFC*) 2024, which is hereby incorporated by reference in its entirety. It should be noted that network management techniques other than SNMP, such as "sniffers" or show commands in the routers and, may be used to acquire the circuit information from the routers.

Figure 4:
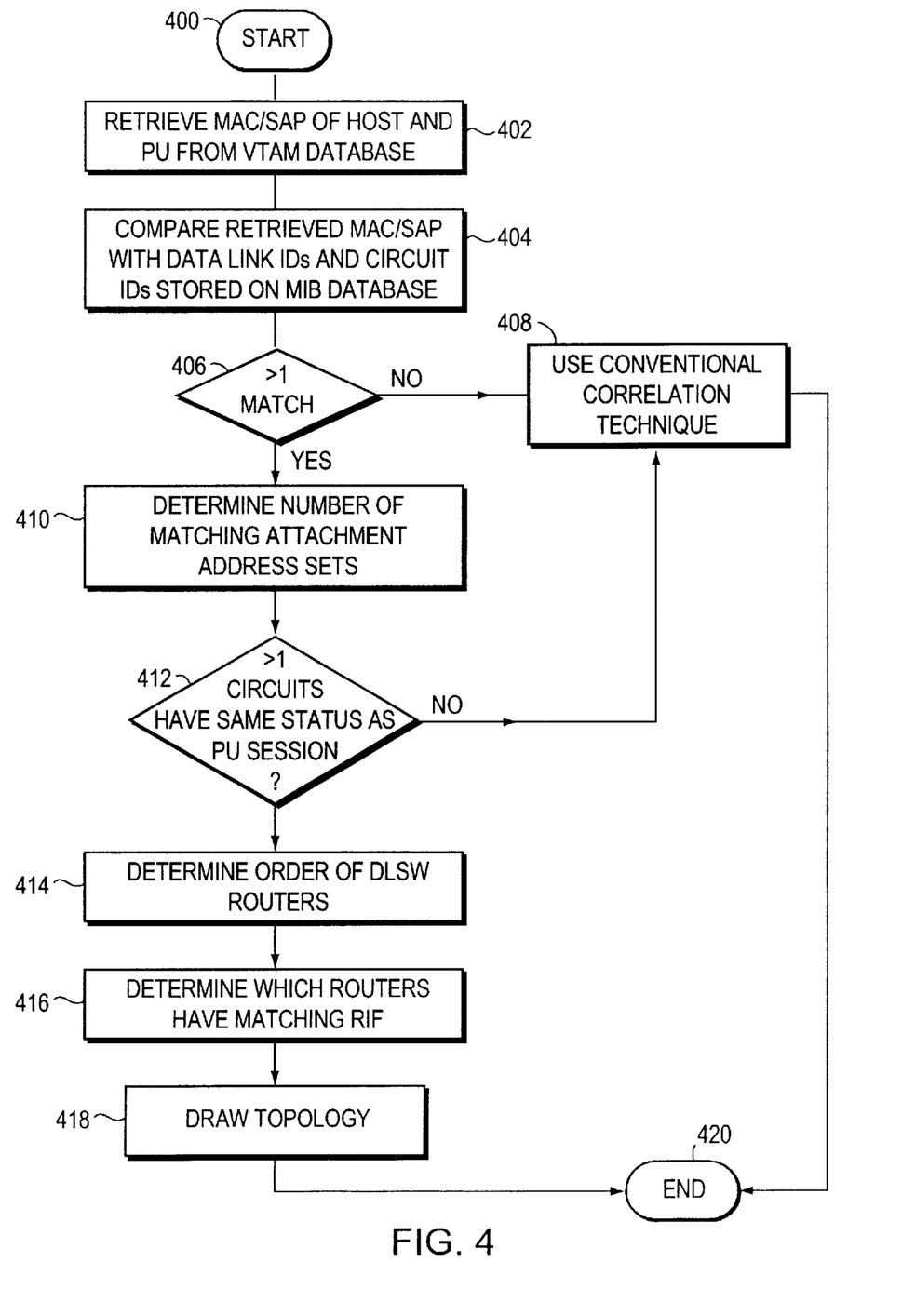
FIG. 4 is a flowchart illustrating the steps involved in a novel correlation technique for a multi-hop peer connection network in accordance with the present invention.

In accordance with the invention, a technique is provided for efficiently correlating the SNA-specific information with the IP-specific information within a DLSw network having a multi-hop peer connection topology. FIG. 4 is a flowchart illustrating the steps involved in a novel correlation technique (process) for a multi-hop peer connection network. The process begins at Step 400 and proceeds to Step 402 where, in response to a query from the network operator specifying a PU name, the NMS performs a look-up operation into the VTAM database using the PU name to retrieve the MAC/SAP addresses for the host and PU. The NMS then performs a look-up operation into the MIB database using those MAC/SAP addresses to retrieve the corresponding IP-specific information (i.e., matching data link IDs and circuit IDs).

The conventional approach involves comparing the MAC/SAP addresses retrieved from VTAM with the contents of the MIB database in order to retrieve a DLSw circuit ID (having matching MAC/SAP attachment addresses) which may then be used to identify the DLSw routers having a peer connection over the IP cloud. However, this conventional approach cannot be efficiently employed in a network having multiple DLSw peer connection hops. The present invention provides a technique for efficiently correlating SNA/IP information in a DLSw network having a multi-hop DLSw peer connection topology.

Specifically in Step 404, the number of peer connection (DLSw circuit) "hops" in the network may be determined by comparing data link IDs stored on the MIB database with the MAC/SAP addresses of the host and PU entities retrieved from the VTAM database. Each data link ID comprises origin and target attachment (MAC/SAP) addresses of a DLSw circuit associated with each router; the orientation of these addresses is dependent on the proximity of the SNA entity connected to each router. For example, the remote DLSw router of each peer connection identifies the MAC/SAP addresses of the PU as its origin attachment address and the MAC/SAP addresses of the host network connection as its target attachment address; the host DLSw router of that peer connection identifies the PU and host connection addresses in reverse order.

Each host (and remote) DLSw router of each peer connection hop will have a matching set of origin and target attachment addresses (or data link IDs) and, according to the invention, the number of matching sets equal the number of peer connections. In Step 406 it is determined whether there are more than one matching sets of addresses; if not, the conventional correlation technique may be used to draw the topology of the resulting single-peer network. (Step 408). If there are more than matching set, then the number of matching sets is determined in Step 410. In the network 300, there are two sets of matches for the host and PU MAC/SAP addresses: DLSw1 and DLSw2, and DLSw3 and DLSw4. In order to maintain a sense of direction, both DLSw1 and DLSw3 identify the MAC/SAP addresses of the host as its origin attachment address and the MAC/SAP addresses of the PU as its target attachment address. Accordingly, it may be determined that here are two circuits (circuit 1 and circuit 2) that have similar orientation of MAC/SAP attachment addresses.

Once the number of DLSw circuits have been identified, the process proceeds to Step 412 where it is determined whether the circuits have the same status. The DLSw circuits generally have the same status as the data traffic (PU session) they service; thus, if the PU session is active, all DLSw circuits are active and if the session is inactive, all the circuits are inactive. If at least-one of the circuits is inactive while another is active, the network topology may include an alternate path that the session traversed through the DLSw network.

Figure 5:
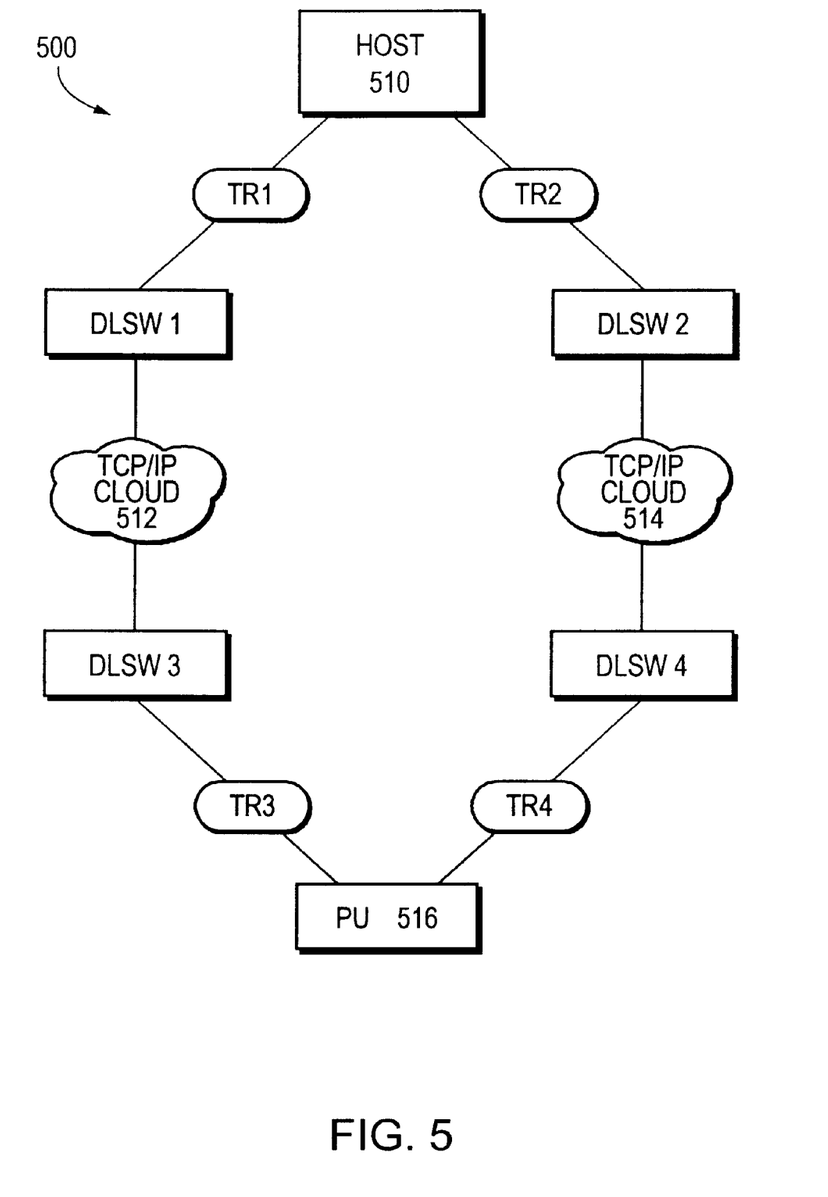
FIG. 5 is a highly schematic block diagram of a redundant DLSw network configuration.

FIG. 5 illustrates a redundant DLSw network configuration 500 having two paths from a host 510 to a PU 516, wherein each path includes a DLSw peer connection. Since SNA is a connection-oriented architecture, only one SNA session path is active at any time and thus only one DLSw circuit for the SNA session is active at a time. The active status of a peer connection is determined by the state information provided to the NMS by the host and the routers. In particular, the state information provided by the host pertains to the PU status (i.e., active or inactive status), whereas the state information provided by SNMP pertains to the DLSw circuit state (i.e., active or inactive status).

According to this step of the technique, the status of each DLSw circuit is determined by examining its circuit state (active or inactive) stored in the MIB database. To ensure the state information is up-to-date, each router may be "demand-polled" for its IP-specific information, rather retrieving the information from the MIB database. In addition to demand-polling, a trap mechanism may be used whereby the DLSw routers report state changes to the NMS using SNMP upon the occurrence of an event (such as a failure). Traps are generally interrupt-driven and represent real-time status updates of the circuits. Notwithstanding the actual mechanism, the intent is to ensure that the databases are current and up-to-date.

If it is determined that only one DLSw circuit is active (i.e., the circuits do not have the same status), the network likely resembles the redundant network configuration 500 having only one active path from the host to the PU and, thus, the conventional approach may be employed to draw the session activity through that network (Step 408). If both circuits are either active or inactive, the network likely resembles the multi-hop peer connection configuration of network 300 and, according to Step 414, the order of the DLSw peer routers with respect to the SNA entities must be determined.

As noted each host (and remote) router associated with each DLSw circuit maintains a similar PU and host orientation, but it may be unclear as to which circuit, and thus which pair of routers, is closer in proximity to the host (or to the PU). Since DLSw1 and DLSw3 identify the host as its origin attachment address and the PU as its target attachment address, the order of the peer routers is either DLSw1–DLSw2 followed by DLSw3–DLSw4 or vice versa. More specifically, the determination in Step 414 involves which DLSw router (DLSw1 or DLSw3) is the first local DLSw router. Such order determination is accomplished by examining the RIF acquired from each router.

In a SNA session traversing a single DLSw circuit, there is a RIF between the remote router and the PU, and a RIF between the host router and the host network connection. If the session traverses two DLSw circuit hops, there is a RIF1 between a first host router of a first circuit and the host network connection, a RIF2 between the first remote router of the first circuit and a second host router of a second circuit, and a RIF3 between a second remote router of the second circuit and the PU. It should be noted that the RIF2 may also be calculated from the second host router to the first remote router wherein only a direction bit in the RIF differs.

In order to determine the directional relationship of the routers from PU to host, a determination is made in Step 416 as to which pair of routers have the same RIF. As noted above, DLSw2 and DLSw3 have a matching RIF2; according to the invention, the matching RIF2 informs the NMS that the DLSw2 and 3 routers are coupled to a common LAN. The order of the local MAC/SAP and remote MAC/SAP addresses may then be used to determine which router pair is closer in proximity to the host (or to the PU). The router with the matching RIF that has a local MAC/SAP of the PU is closer in proximity to the host; in this case, DLSw2 has local MAC/SAP addresses of the PU.

Therefore, the order of the DLSw peer routers with respect to the SNA entities is determined to be that of network 300. The order can be confirmed because, inter alia, the remote peer IP address obtained from DLSw2 is that of DLSw1 (and the remote peer IP address obtained from DLSw3 is that of DLSw4). On the other hand, if the RIFs do not match or if one of the circuits is inactive, then the routers most likely assume a topology orientation of the network 500.

The inventive multi-hop peer connection correlation technique can be extended to any number of hops in a DLSw network. To that end, matching RIFs for each end of the network must be found. Specifically, two sets of DLSw peer connections will not have matching RIFs; these sets are the host-side DLSw circuit (identified by the router having a matching RIF with the local MAC/SAP address being that of the PU) and the PU-side circuit (identified by the router having a matching RIF with the local MAC/SAP address being that of the host). The remaining orientation of routers may be determined by ordering matching RIFs. Once the order of the DLSw peer routers is determined, Cisco-Works Blue Maps software graphically displays the network topology of the DLSw network on the GUI screen (Step 418), thereby illustrating the relationship between the DLSw routers and the SNA entities of the network. The process then ends in Step 420.

Advantageously, the invention provides a technique that efficiently correlates SNA-specific information with the IP-specific information to draw the multi-hop network topology needed to assist in problem isolation. The inventive correlation technique allows the NMS to manage relationships between the entities for purposes of, e.g., activating/deactivating those entities and monitoring SNA frame traffic encapsulated within IP protocol packets. In addition, the inventive correlation technique may be used for trouble-shooting operations to identify associations between specific DLSw and SNA entities, and to generally view dependency relationships between such entities in the network environment.

Figure 6:
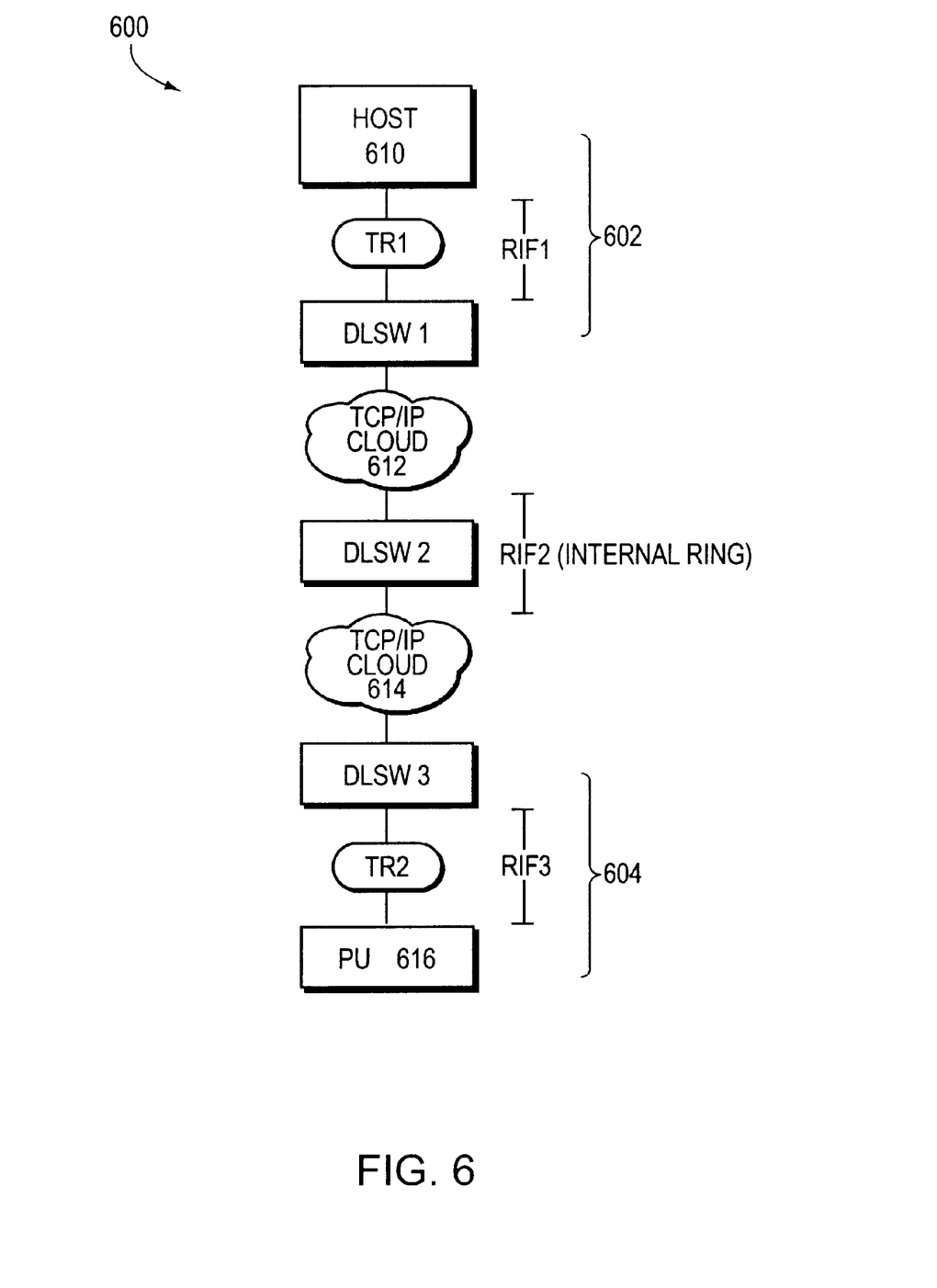
FIG. 6 is a highly schematic block diagram of an alternate embodiment of a DLSw network comprising a plurality of SRB subnetworks interconnected by a plurality of WANs using a common DLSw "peer" router to form a multi-hop peer connection topology that may be advantageously used with the present invention.

FIG. 6 is a highly schematic block diagram of an alternate embodiment of a DLSw network 600 comprising a plurality of SRB subnetworks 602–604 interconnected by a plurality of WANs 612–614 using a common DLSw2 "peer" router to form a multi-hop peer connection topology. Here, if IP-specific information is collected only from DLSw2, the information about DLSw1 and DLSw3 may be inferred from DLSw2. The following IP-specific information is available from each router:

| Router | Local MAC/SAP | Remote MAC/SAP | Peer Router | RIF |
| --- | --- | --- | --- | --- |
| DLSw1 | Host | PU | DLSw2 | RIF1 |
| DLSw2 | PU | Host | DLSw1 | RIF2 |
| DLSw2 | Host | PU | DLSw3 | RIF2 |
| DLSw3 | PU | Host | DLSw2 | RIF3 |

In general, the novel technique described in connection with FIG. 4 may be employed to correlate information relating to the host, PU and DLSw routers to thereby enable drawing of the network topology 600. According to this aspect of the invention, the determination of routers having a matching RIF indicates that the middle "peer" is the same router (i.e., DLSw2), thereby enabling drawing of the session path.

While there has been shown and described an illustrative embodiment for efficiently correlating information pertaining to entities of a computer network having a multi-hop peer connection topology, it is to be understood that various other adaptations and modifications may be made within the spirit and scope of the invention. For example in yet another alternate embodiment, the RIF 1 information may be provided by VTAM to the NMS over the TCP/IP pipe when the host network connection is a network control point connection. Here, the RIF provided within the IP-specific information can be compared with the RIF1 supplied by VTAM to determine which DLSw router is the first local router coupled to the host. In the illustrative embodiment shown in FIG. 3, that router is DLSw1. Once DLSw1 is determined to be the first local router coupled to the host, then its peer DLSw2 can be determined from another piece of information contained within the IP-specific information; namely, the remote peer IP address.

A next step of this alternate embodiment is to determine which DLSw peer connection follows the DLSw1–DLSw2 peer connection. In this case, there is only one other peer connection (DLSw3–DLSw4), so the determination is directed to the orientation of those two routers. For DLSw2, the local MAC/SAP addresses are that of the PU and the remote MAC/SAP addresses are that of the host, whereas in the case of DLSw3, the local MAC/SAP addresses are that of the host and the remote MAC/SAP addresses are that of the PU. Moreover, the RIF (e.g., RIF2) contained in the IP-specific information obtained from DLSw2 matches the RIF obtained from DLSw3 (with the exception of the direction bit). Thus, the topology of the network may be drawn.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for correlating information pertaining to a host and a physical unit of a data link switching (DLSW) network having multiple source-route-bridge (SRB) subnetworks interconnected by DLSw peer routers in a multi-hop peer connection topology, the network including a network management station (NMS) having a first database for storing system network architecture (SNA)-specific information and a second database for storing IP-specific information, the method comprising the steps of:

determining a number of DLSw circuits in the DLSw network;

verifying that each DLSw circuit has a similar state;

determining an order of the respective DLSw peer routers by comparing routing information fields (RIFs) of the routers; and drawing the multi-hop peer connection topology of the DLSw network.

2. The method of claim 1 wherein the step of determining the number of DLSw circuits comprises the steps of:

retrieving media access control (MAC)/service access point (SAP) addresses of the host and PU from the first database;

comparing the retrieved MAC/SAP addresses with data link identifiers (IDs) stored on the second database; and determining the number of matching data link IDs.

3. The method of claim 2 wherein the step of determining the number of DLSw circuits further comprises the step of associating the matching data link IDs with corresponding DLSw circuit IDs stored on the second database, the DLSw circuit IDs associated with respective DLSw peer routers.

4. The method of claim 3 wherein the step of verifying comprises the step of examining circuit states of the associated DLSw circuit IDs.

5. The method of claim 4 wherein the second database is a management information base (MIB) database and wherein the step of examining comprises the step of retrieving the circuit states from the MIB database.

6. The method of claim 4 wherein the step of examining comprises the step of polling the routers for the circuit states.

7. The method of claim 5 wherein the step of determining an order of the respective DLSw routers comprises the steps of:

acquiring the RIFs from the routers from the MIB database;

comparing the acquired RIFs to find matching RIFs; and upon finding matching RIFs, determining an orientation of the MAC/SAP addresses of the host and PU maintained by the routers of the matching RIFs.

8. The method of claim 7 wherein the step of determining an order of the respective DLSw routers further comprises the step of associating the acquired RIFs that do not match with one of a host-side DLSw circuit and a PU-side DLSw circuit.

9. The method of claim 8 wherein the step of determining an orientation comprises the steps of:

identifying one of the routers of the matching RIFs with a local MAC/SAP address of the PU as being closer in proximity to the host than another of the routers of the matching RIFs; and confirming the step of identify the one router using a remote peer address of the one router.

10. A method for correlating information pertaining to host and physical unit (PU) entities of a data link switching (DLSW) network having multiple source-route-bridge (SRB) subnetworks interconnected by DLSw peer routers in a multi-hop peer connection topology, the network including a network management station (NMS) having a first database for storing system network architecture (SNA)-specific information and a second database for storing IP-specific information, the method comprising the steps of:

retrieving media access control (MAC)/service access point (SAP) addresses of the host and PU from the first database;

comparing the retrieved MAC/SAP addresses with data link identifiers (IDs) stored on the second database;

determining the number of matching data link IDs;

associating the matching data link IDs with corresponding DLSw circuit IDs stored on the second database, the DLSw circuit IDs associated with respective DLSw peer routers;

examining circuit states of the associated DLSw circuit IDs and, if the circuit states are the same;

determining an order of the respective DLSw peer routers by comparing routing information fields (RIFs) of the routers; and drawing the multi-hop peer connection topology of the DLSw network.

11. The method of claim 10 wherein the step of determining an order of the respective DLSw routers comprises the steps of:

acquiring the RIFs from the routers;

comparing the acquired RIFs to find matching RIFs; and upon finding matching RIFs, determining an orientation of the MAC/SAP addresses of the host and PU maintained by the routers of the matching RIFs.

12. The method of claim 11 wherein the step of determining an order of the respective DLSw routers further comprises the step of associating the acquired RIFs that do not match with one of a host-side DLSw circuit and a PU-side DLSw circuit.

13. The method of claim 12 wherein the step of determining an orientation comprises the steps of:

identifying one of the routers of the matching RIFs with a local MAC/SAP address of the PU as being closer in proximity to the host than another of the routers of the matching RIFs; and confirming the step of identify the one router using a remote peer address of the one router.

14. A computer readable medium containing executable program instructions for correlating information pertaining to host and physical unit (PU) entities of a data link switching (DLSw) network having multiple source-route-bridge (SRB) subnetworks interconnected by DLSw peer routers in a multi-hop peer connection topology, the network including a network management station (NMS) having a first database for storing system network architecture (SNA)-specific information and a second database for storing IP-specific information, the executable program instructions comprising the program instructions for:

determining a number of DLSw circuits in the DLSw network;

verifying that each DLSw circuit has a similar state;

determining an order of the respective DLSw peer routers by comparing routing information fields (RIFs) of the routers; and drawing the multi-hop peer connection topology of the DLSw network.

15. The computer readable medium of claim 14 wherein the program instruction for determining the number of DLSw circuits comprises program instructions for:

retrieving media access control (MAC)/service access point (SAP) addresses of the host and PU from the first database;

comparing the retrieved MAC/SAP addresses with data link identifiers (IDs) stored on the second database; and determining the number of matching data link IDs.

16. The computer readable medium of claim 15 wherein the program instructions for determining the number of DLSw circuits further comprises program instructions for associating the matching data link IDs with corresponding DLSw circuit IDs stored on the second database, the DLSw circuit IDs associated with respective DLSw peer routers.

17. The computer readable medium of claim 16 wherein the program instructions for verifying comprises program instructions for examining circuit states of the associated DLSw circuit IDs.

18. The computer readable medium of claim 17 wherein the program instructions for determining an order of the respective DLSw routers comprises program instructions for:

acquiring the RIFs from the routers from the MIB database;

comparing the acquired RIFs to find matching RIFs; and upon finding matching RIFs, determining an orientation of the MAC/SAP addresses of the host and PU maintained by the routers of the matching RIFs.

19. The computer readable medium of claim 18 wherein the program instructions for determining an order of the respective DLSw routers further comprises program instructions for associating the acquired RIFs that do not match with one of a host-side DLSw circuit and a PU-side DLSw circuit.

20. The computer readable medium of claim 19 wherein the program instructions for determining an orientation comprises program instructions for:

identifying one of the routers of the matching RIFs with a local MAC/SAP address of the PU as being closer in proximity to the host than another of the routers of the matching RIFs; and confirming the step of identify the one router using a remote peer address of the one router.

* * * * *

UNITED STATES PATENT AND TRADEMARK OFFICE
CERTIFICATE OF CORRECTION

PATENT NO. : 6,571,272 B1
DATED : May 27, 2003
INVENTOR(S) : Darin Ferguson et al.

It is certified that error appears in the above-identified patent and that said Letters Patent is hereby corrected as shown below:

Title page, Item [54] and Column 1, lines 1 thru 3,
Please correct the title to read:
-- METHOD AND APPARATUS FOR SNA/IP CORRELATION WITH MULTIPLE DLSw PEER CONNECTIONS --

Column 1,
Line 19, delete "09/315,444" and replace with -- 09/315,441 --

Signed and Sealed this

Ninth Day of September, 2003

JAMES E. ROGAN
*Director of the United States Patent and Trademark Office*